Dec. 12, 1939.  E. E. SMITH  2,183,434
SELF-ADJUSTING POWER TRANSMISSION
Filed July 6, 1937  3 Sheets-Sheet 2
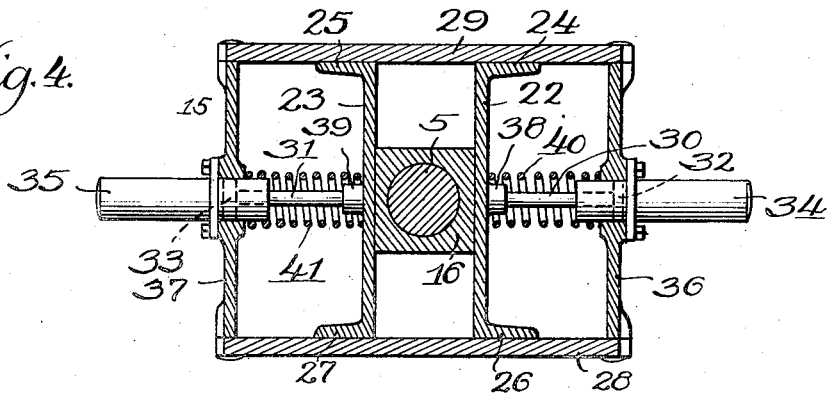
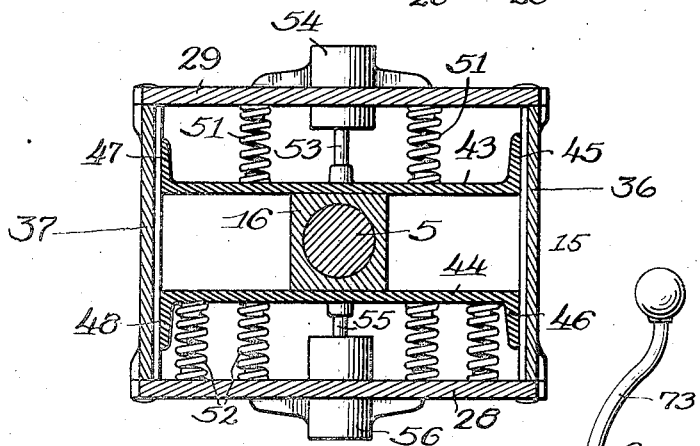
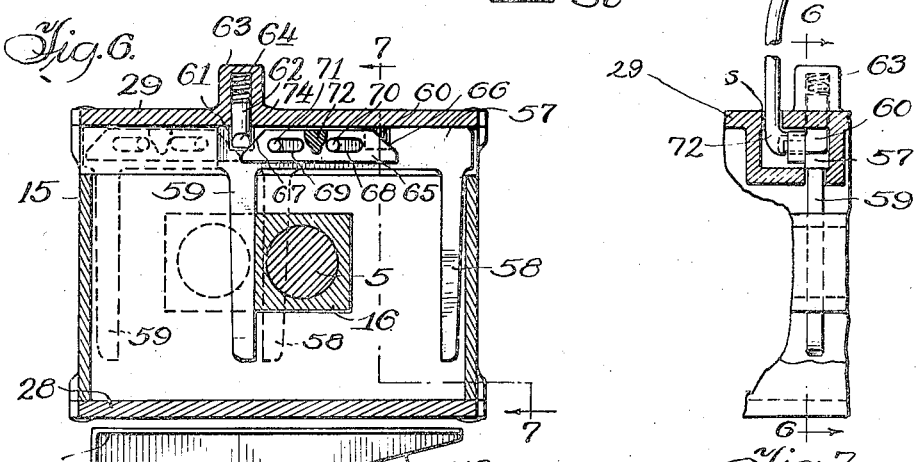
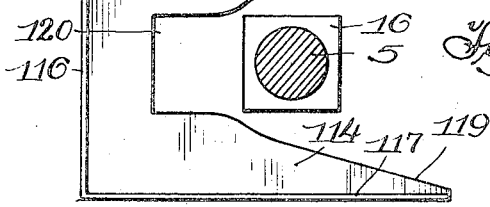
Inventor,
By Elwood E. Smith
Parkinson & Lane Attys Dec. 12, 1939.     E. E. SMITH     2,183,434
SELF-ADJUSTING POWER TRANSMISSION
Filed July 6, 1937     3 Sheets-Sheet 3

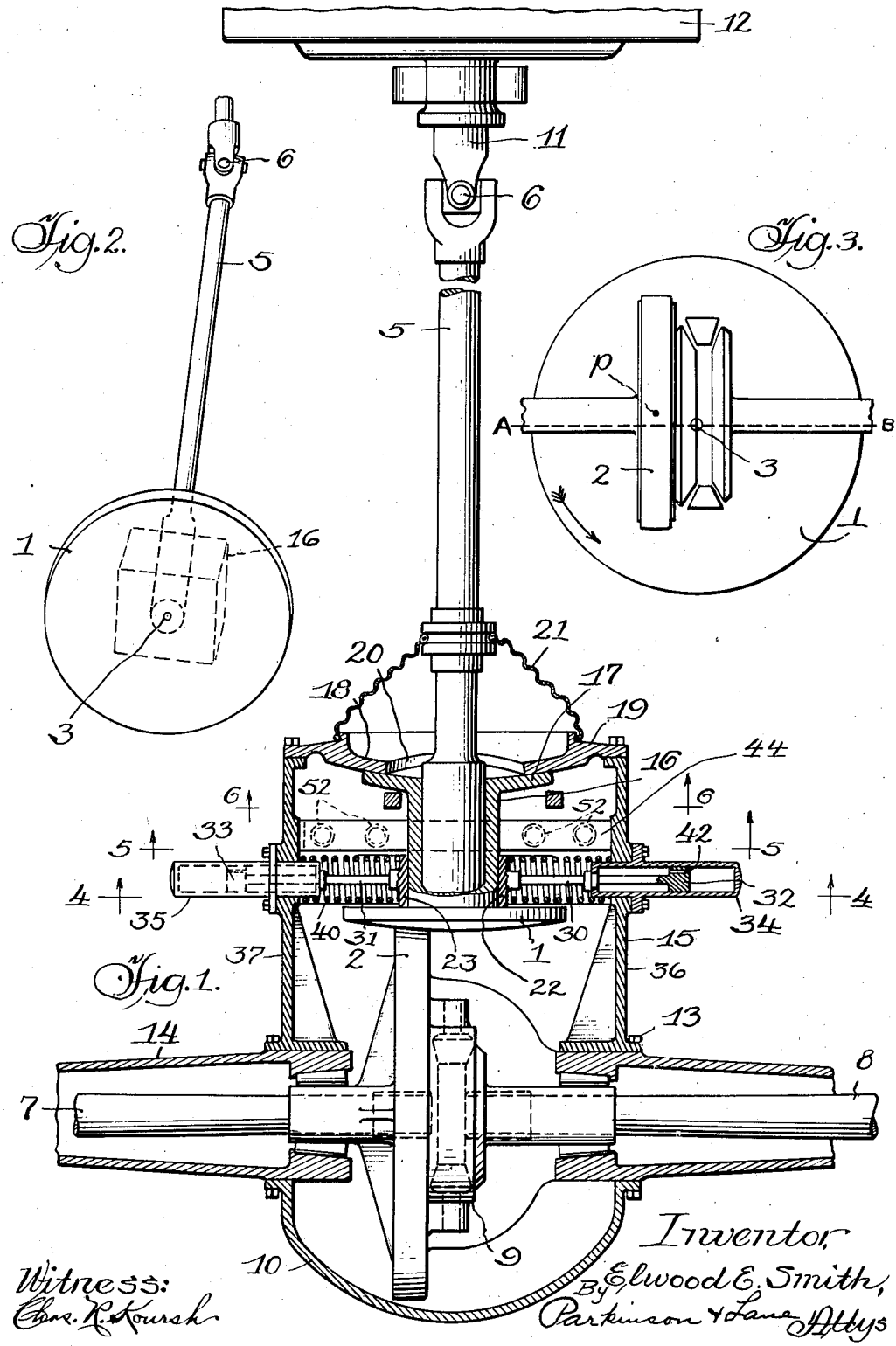

Witness:
Chas. R. Marsh

Inventor
Elwood E. Smith
By Parkinson & Lane
Attys

Patented Dec. 12, 1939

2,183,434

UNITED STATES PATENT OFFICE 2,183,434

SELF-ADJUSTING POWER TRANSMISSION

Elwood E. Smith, Chicago, Ill.

Application July 6, 1937, Serial No. 152,090

13 Claims. (Cl. 74—190.5)

This invention relates to self-adjusting power transmitting mechanism and more particularly to power transmitting mechanism for automatically adjusting the working relation between the driving power and the driven element in automobiles and other machinery.

Among the objects of the present invention is the provision of means for automatically adjusting the driving power with relation to the driven element or load resistance in such manner that when the load resistance is increased in the operation of the mechanism the relation between the driving element and the driven element will be such as to automatically move one or the other of these elements into that position most favorably adapted to overcome the additional load, having in mind the change of speeds, etc. during operation of an automobile or other types of driving mechanism.

Another object is the provision of mechanism whereby when the inertia in an automobile, for example, is overcome either completely or substantially, the driving member and driven member will be automatically adjusted to accommodate this greater speed which, due to the inertia having been largely overcome, will be required to transmit less power.

A further object is the provision of transmission mechanism such that as the inertia is overcome and the momentum built up in an automobile, the position between the driving and driven elements will be shifted automatically to such degree and in such direction that the fullest possible use may be made of all power delivered by the engine to attain the greatest possible speed from the power, and such change in requirements will be taken care of without the necessity of any manual operation.

A still further object is to provide power transmission mechanism that will automatically adjust the transmission of motive power to the most advantageous leverage against varying load resistance with the use of friction driven and driven discs, by providing a flexibility of movement in the bearing holding the driving shaft near said discs and a universal joint in the end of the drive shaft farthest from the bearing and the discs.

Another object is the provision of power transmitting mechanism more efficient in operation, flexible in performance, automatic in movement and adaptation to varying loads, economical in manufacture, compact and simple in construction, available for use on cars already built with a minimum of alteration, providing a saving of wear on engine parts through the eliminating of overstrain on the one hand and racing without load on the other hand, ease of operation, prevention of the possibility of stalling the motor or engine through failure to shift into a lower gear leverage, materially lessening the need of attention by the driver or operator, thus giving him greater freedom for maneuvering the car or the automobile or other mechanism, to prevent undue vibrations from road shocks and the like, to create such structure that is practically foolproof in operation, to eliminate the necessity for gear shifting in automobiles or the like, to permit of greatly increased acceleration especially from standing start by providing a continuous flow of power without interrupting the delivery of power while shifting gears, and to eliminate the possibility of mishandling by the operator.

Other objects, advantages and capabilities inherent in the mechanism will later more fully appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Fig. 1 is a longitudinal horizontal section through the power transmission mechanism and associated parts of an automobile or the like.

Fig. 2 is a perspective diagrammatic view of the floating driving disc, its floating bearing, driving shaft and universal joint for the latter.

Fig. 3 is a diagrammatic view from the rear of the driving disc and driven element, in which the relative size of the driving disc and driven element has been distorted for convenience.

Fig. 4 is a transverse vertical section through the floating bearing block and associated parts, showing the mechanism for controlling the sidewise movements of the bearing block and preventing undue disturbance from sudden vibrations.

Fig. 5 is a view similar to Fig. 4 but showing the arrangement for controlling the up and down vibrations and movements.

Fig. 6 is a more or less diagrammatic view showing mechanism for positively holding the parts from moving into reverse position and for moving them into reverse position when desired, and is a vertical transverse section taken approximately on the line 6—6 of Fig. 7.

Fig. 7 is a fragmentary vertical longitudinal section taken approximately on the line 7—7 of Fig. 6.

Fig. 11 is a rear face view of a guide plate which in some instances will be used for limiting the movement of the floating bearing within certain limits.

Figure 8:
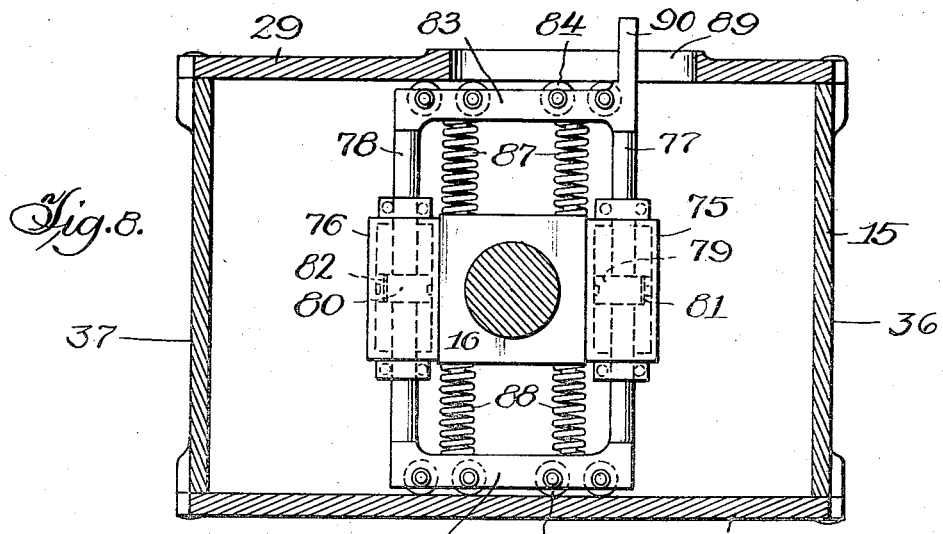
Fig. 8 is a vertical transverse section showing a modification of the mechanism shown in Fig. 5 for controlling the up and down movements of the floating bearing block and driving disc.

In the specific illustration shown in the drawings, the driving and driven members are a movably mounted friction disc 1 and a friction wheel 2, respectively, so arranged and mounted that when the car is being started from rest the driven friction wheel 2 will occupy a position more or less close to the axis of the driving disc 1, where the leverage or mechanical advantage is in favor of the driving power or engine, but as the speed and momentum of the car is built up so that less power is required and greater speed attained, the point of contact between the driven disc wheel 2 and the driving friction disc 1 will automatically move outwardly toward the circumference of the driving friction disc 1. Should greater power be required to be transmitted from the driving element through the driven element to the wheels or other effective portion of the driven mechanism, the point of contact between the driven element 2 and the driving friction disc 1 will again automatically move inwardly to a position nearer to the center 3 of rotation of the driving friction disc 1.

In general it is pointed out that the force which causes the point of contact between the driven friction wheel 2 and the driving friction disc 1 to move either outwardly or inwardly with relation to the circumference of the driving friction disc 1, is a lateral force created by the rotation of the driving friction disc, the factor determining whether this movement be outward or inward being whether the point of contact between the driven friction wheel 2 and the driving friction disc 1 is above or below the horizontal diameter of the driving friction disc. If this point of contact is above said horizontal diameter A—B, see Fig. 3, and the disc is rotating counterclockwise as shown by the direction of the arrow in Fig. 3, (assuming the point of contact now being specifically referred to to be that indicated at p in Fig. 3), it will be obvious that, due to the direction of movement of the elements of the surface or face of said driving friction disc 1 above the horizontal diameter being to the left as well as downward, this right to left rotating movement of the driving disc above said horizontal diameter will force against the driven wheel tending to move it to the left. Because of the fixed position of the driven wheel, the reaction to this force will instead move the driving disc to the right. This will carry the point of contact to the left on the driving disc or toward the outer circumference. This change of position or movement of the point of contact, and the shifting of the driving disc and its floating bearing 16, is made possible by the incorporation in the driving shaft 5 of a universal joint 6, which permits swinging movement of the driving disc 1 in any lateral or up and down direction except as the same is controlled by means referred to hereinafter, without loss of rotational driving power or torque. It is to be understood that the floating bearing 16 in Fig. 2 is only shown diagrammatically and for illustrative purposes and not in its correct structural form, which latter is shown in the other views.

The point of contact p shown in Fig. 3 is to be considered for illustrative purposes to be that position which this point of contact normally assumes when the driving mechanism and associated parts are at rest. It has been shown above that when the point of contact is above the horizontal diameter of driving disc 1, the reaction between driving disc 1 and driven element 2 is such as to cause driving disc 1 to move to the right as viewed in Fig. 3 to tend to cause the point of contact to move outward with relation to the driving disc 1 toward the outer circumference of the latter. Also due to the reaction between driving disc 1 and driven element 2 at the point of contact, it is pointed out that in addition to the movement of point of contact p toward the circumference of the driving disc 1, it will be understood that there is also a downward component of force at this point of contact which will tend to cause driving disc 1 to rise and carry the point of contact below the horizontal diameter A—B of the driving disc.

As will be readily understood, the direction of movement of the element in that portion of the face of driving disc 1 below the horizontal diameter A—B when said disc is rotating in the direction indicated by the arrow in Fig. 3, will be downward and from left to right as viewed in Fig. 3. This means that when the point of contact is carried below the horizontal diameter A—B by the rising of disc 1, as explained above, the resistance and reaction between discs 1 and 2 will be such as to cause disc 1 to move to the left as viewed in Fig. 3, and thus bring the point of contact nearer to the center of rotation 3. The adjustment of the control springs and associated parts and reverse mechanism described more in detail hereinafter, is such, however, as to prevent the point of contact from actually reaching the center of rotation 3 during forward movement of the automobile or the like. It will also be understood that the leverage or mechanical advantage is greater in driving effect when the point of contact is nearer to the center of rotation than when it is farther away therefrom. With the point of contact in this favorable position, the power transmitted from the motor or engine is easily able to overcome resistance of the driven parts and build up momentum and speed of the automobile or the like. As the momentum increases the resistance to the driving power decreases, allowing the driving disc 1 to sink to its original position where the point of contact is again above the horizontal diameter A—B.

The forces which will move the point of contact above or below the horizontal diameter A—B of the driving disc are two, (1) the force downward is caused by the resistance of the driven load (transmitted through wheel 2) to the driving torque of disc 1, which causes the disc 1 to rise in reaction to this resistance, bringing the point of contact lower. This is operative force caused by forces found in driving the car. (2) The upward tendency is caused by the prearranged adjustment of the spring controls as shown in Figs. 4 and 5, which are so adjusted that their tension pulling against each other brings the disc into such position that point of contact is at $p$ above the horizontal diameter. When moved out of this position these controls try to bring point of contact back to it. This force is overcome only by the torque trying to overcome a greater resistance from wheel 2.

Thus it will be seen that the point of contact is only brought down when load resistance is greater, and by being brought down it is moved toward the center where the power is greater to overcome this resistance. The point of contact is only moved up when resistance is less and the power can overcome more. By being brought higher above A—B it is moved outward to where resistance is greater but the speed obtained from the power is also greater.

The force which moves point of contact in or out with relation to circumference of disc 1, is a force tangent to a circle on the disc the radius of which is the distance from the present point of contact to the axis. The rotation in my examples being counter-clockwise, the direction of the movement of the elements of the surface of disc 1 produce a force acting against an object resting at a point above horizontal diameter, which will be toward the left and down. The downward force is utilized in my device to rotate the driven wheel 2. The right to left force pushing against wheel 2 (which cannot move sidewise) moves disc 1 to the right in a reaction against the resistance of fixed wheel 2. The force below the horizontal diameter A—B is moving in the direction of the rotation at this point and is seen to be from left to right as well as down. These forces from left to right or right to left will be found proportionately greater according to the distance above or below the horizontal diameter A—B.

It is to be understood that an essential factor in the operation of this automatic feature is that the controls hereinafter described are such as to seek to bring this point of contact above the horizontal diameter A—B and to the position $p$ shown in Fig. 3. Now when some momentum has been built up and the power is easily overcoming the resistance of the driven parts and the point of contact is above the horizontal diameter A—B, there is found operative again the thrusting motion from right to left. This thrusting motion pushing against wheel 2, as explained above, will cause the driving disc 1 to move to the right, bringing the point of contact nearer and nearer to the circumference of the driving disc, this motion toward the left occurring as fast as the driving power overcomes the load resistance of the driven parts.

At any point in this outward movement at which the load resistance of wheel 2 to the driving rotation of disc 1 becomes such that the load resistance and driving power are equal, then at that point the resistance of the driven load to the driving torque will cause the disc 1 to rise until the point of contact is at the horizontal diameter A—B. At this point it is to be understood that the point of contact is nearer to the circumference of driving disc 1 than it is to the center of rotation, and hence is thus automatically carried to a position and placed in such condition that the automobile or the like is being driven at the greatest speed possible with the power being delivered from the engine or the like. Any variation in the balance between the driving power and load resistance will cause the driving disc to rise in reaction against the resistance or to sink because of lack of resistance to its rotation and in response to the controls heretofore mentioned, and further responding to the inward or outward thrusts, depending on the higher or lower position of point of contact, the said point of contact will be moved inward toward the center or outward toward the circumference until balance is again established between driving torque and load resistance.

As seen in Fig. 1, the driven wheel 2 is fixedly mounted upon a member of the differential mechanism 9, which drives the rear axles 7 and 8. The differential mechanism and driven wheel 2 are mounted in the usual differential housing 10. The differential device is used as in the present automobiles without change except for securing the driven wheel 2 in association therewith to take the place of the old form of ring gear. In other words, the driven wheel 2 is driven by the driving disc 1 and when so driven is associated and connected with the differential and rear axles 7 and 8 as to carry out the usual driving operations to the rear wheels of the automobile. To facilitate efficient contact between the driving faces of driving disc 1 and driven wheel 2, the driving face of disc 1 is curved on its entire face in an arc of a circle, the radius of which is the distance from its contact with wheel 2 to the universal joint 6 at the front end of the driving shaft 5 upon which it is mounted, thus forming a spherical surface on the face of said driving disc so as to at all times preserve the full contact between disc 1 and wheel 2. To insure good driving contact between disc 1 and wheel 2, suitable means (such as springs) may be used to normally urge disc 1 against wheel 2, but subject to manual control to separate said disc and wheel when desired by longitudinal movement of drive shaft 5.

Drive shaft 5 through the universal joint 6 is driven by the engine shaft 11 of the internal combustion engine or other source of motive power indicated generally at 12. Secured by bolts or the like 13 to the front of the axle housing 14 is a frame 15 which carries the floating driving disc 1, floating bearing 16 and associated parts, as hereinafter described. Driving disc 1 is suitably fixed to the rear end of shaft 5 to rotate therewith. Surrounding the rear end of shaft 5 to form a bearing therefor, is the floating bearing member 16, the rear end of which is closely adjacent the driving disc 1. In the form shown in the drawings for illustrative purposes, the exterior configuration of the bearing 16 is rectangular to form opposed faces to act as receiving surfaces for springs and the like described more fully later herein. As shown in Fig. 1, the front end of floating bearing 16 is formed with an annular flange 17 which is slidably associated with the flange 18 of the plate 19 forming the front end of frame 15. Plate 19 is formed with the aperture 20 of a size larger than the diameter of shaft 5, sufficiently to give the necessary freedom of movement of the rear end of said driving shaft during operation. For illustrative purposes, I have shown a flexible enclosing member 21 which is suitably connected at one end to closure plate 19 and at the other end has rotatable sliding engagement with shaft 5 to close the interior of the frame 15 against the entry of dust, dirt and the like.

Within frame 15 and preferably adjacent the driving disc 1, are mounted a pair of spaced plates (see Fig. 4) or guide members 22 and 23, the opposite ends of which are formed with flanges 24, 25, 26 and 27, the latter two of which have sliding engagement with the bottom plate 28 of frame 15 and the former two of which have sliding engagement with the top plate 29 of said frame. Suitable anti-friction devices may be provided between ends 24, 25, 26 and 27 and the plates against which they slide, such as ball bearings, roller bearings, or the like. Extending outwardly from each of these guide plates 22 and 23 are piston rods 30 and 31, which at their outer ends each carry a piston head 32, 33, which in turn is reciprocally mounted in a cylinder 34, 35, which cylinders are fixed to the side plates 36, 37, respectively, of the frame 15 by suitable bolts or the like. Also each of the guide plates 22 and 23 is formed with a boss or the like 38, 39, seated around each of which is one end of the springs 40, 41, the other end of which springs is seated around the adjacent end of each of the cylinders 34 and 35. The piston heads 32 and 33 (see Fig. 1) are each provided with an aperture 42 (only one of these being shown in detail in Fig. 1, the other being of similar construction). Any number of these apertures may be formed in these piston heads as desired.

This arrangement permits, as seen in Fig. 4, sidewise movement of the floating bearing 16 and driving shaft 5 due to the pressure from side to side from disc 1 against driven wheel 2, as pointed out more fully earlier herein. This lateral movement of floating bearing 16 may also be accompanied by a vertical sliding movement of bearing 16 against and between the adjacent faces of the guide plates 22 and 23, which vertical movement is controlled by spring pressure and cylinder resistance, as will be more fully explained hereinafter in connection with Fig. 5. The horizontal lateral movement of bearing 16 in Fig. 4 will be accomplished under the influence of the springs 40 and 41, which springs are so adjusted as to, in conjunction with the adjustment of the springs later described in connection with Fig. 5, normally hold the point of contact $p$ in the position shown in Fig. 3 when the parts are at rest and discs 1 and 2 separated, as they may be when desired. In other words, if the driving disc 1 and the driven wheel 2 are separated, the adjustment of the springs shown in Figs. 4 and 5 is such that these springs will immediately carry the point of contact to the point $p$ in Fig. 3. The horizontal lateral movement of bearing 16 (see Figs. 1 and 4) will also be controlled by the passage of oil or other suitable liquid in cylinders 34 and 35, through aperture 42 in piston heads 32 and 33. The action of these apertures 42, together with the action of the springs 40 and 41, will prevent any sudden undue lateral movement of bearing 16 in horizontal directions, and will cause such movement to be more steady and free from abrupt fluctuations. As stated, bearing 16 may in addition to this horizontal lateral movement also have vertical lateral movement between plates 22 and 23, and this arrangement is such that the horizontal lateral movement of bearing 16 may occur when said bearing is at any position between the ends of plates 22 and 23.

Referring now to Fig. 5, there are also provided in the frame 15 a pair of spaced horizontally extending guide plates 43 and 44, which function in a similar manner to plates 22 and 23 in Fig. 4 but in a direction at right angles to the movement thereof. In other words, guide plates 43 and 44 are provided with end portions 45, 46, 47 and 48, which have sliding engagement with the inner adjacent faces of the side plates 36 and 37 of frame 15, and may likewise be provided with ball bearings, roller bearings, or other suitable anti-friction devices, to facilitate this sliding action.

Bearing member 16 is slidably mounted between plates 43 and 44, as seen in Fig. 5, to accommodate the horizontal lateral movement of bearing member 16. Mounted between plate 43 and top plate 29 of frame 15, are any desirable number of springs 51, which at their ends may seat over suitable bosses or other projections for holding them in place. Mounted between plate 44 and bottom plate 26 of frame 15 are any desired number of suitable springs 52, likewise seated and held in place at their ends by bosses, projections or the like. Also connected to plate 43 is a piston rod 53 carrying a piston head slidably mounted in cylinder 54, and provided with apertures not shown for purposes and operation similar to those of the piston heads 32 and 33. A similar piston rod 55 and cylinder 56 (and piston head not shown) are also provided between bearing plate 44 and bottom plate 28 of frame 15. The springs 51 and 52 are also constructed, arranged and assembled to assist in normally bringing the point of contact $p$ to the position shown in Fig. 3, when the driving disc 1 and driven wheel 2 are separated. In other words, the arrangement shown in Fig. 4 and the arrangement shown in Fig. 5 cooperate with each other to normally bring the point of contact to this position when the disc 1 and wheel 2 are separated. Any suitable mechanism desired may be provided for causing a slight longitudinal movement of shaft 5 and driving disc 1 so as to separate driving disc 1 and driven wheel 2 a slight distance when desired. Also the automobile or the like will be provided with the usual clutch between the universal joint 6 and the engine 12 for interrupting the connection between the driving power and the shaft 5. Such clutch being of the conventional type has not been shown on the drawings.

The mechanism shown in Fig. 5 will permit an up and down movement of bearing block 16 at any and all positions throughout the horizontal length of plates 43 and 44. Springs 51 in Fig. 5 are preferably heavier and stronger than springs 40 and 41 in Fig. 4, in order to controllably resist the upward movement of shaft 5 due to the upward thrust of the torque in transmitting the power from the drive shaft to the load. These springs while normally resisting such upward thrust will permit a desired amount to be used in achieving the aforementioned change of position of the point of contact necessary to the automatic adjustment of leverage. The strength of the springs 52 in Fig. 5 must be sufficiently great to hold bearing member 16, plates 43 and 44 and associated parts, against undue movement downward due to gravity. Cylinders 54 and 56 with their apertured pistons will take care of any undue sudden vertical shocks or vibrations.

As seen in Fig. 1, the mechanism of Fig. 4 for controlling lateral horizontal movement of bearing plate 16, is placed closely adjacent to that of Fig. 5 for controlling the vertical movements of said bearing member. As will be explained later herein, the lateral horizontal movements of bearing member 16 will be so controlled as to positively prevent such movement beyond the reverse side of the axis of rotation. In other words, special mechanism is provided, as will be later described, for effecting reverse operation of the automobile or the like, yet the lateral horizontal movement of the floating member is permitted in accordance with the requirements of the forward operations.

Referring now to Figs. 6 and 7, a controlling mechanism is provided for positively holding the floating bearing member on that side of the axis of rotation for forward operations, but yet upon proper manipulation permitting reverse to be accomplished. Slidably mounted in the upper portion of the frame 15 is a plate 57 provided with downwardly extending arms 58 and 59, and in its upper surface formed with a pair of notches 60, 61, each adapted to selectively receive the locking pin or catch 62 mounted in an aperture in the upstanding dome portion 63 and normally pressed downwardly by spring 64. Slidably connected to the side face of plate 57 is an unlatching plate 65 provided at its ends with cam surfaces 66 and 67 and having slots 68, 69, which slots are slidable over pins 70, 71 carried by plate 57, and provided at their outer ends with suitable heads to hold unlatching plate 65 in suitable position with relation thereto.

When the parts are as shown in Fig. 6, the latching pin 62 is in recess 61 to hold plate 57 against longitudinal sliding movement. In this position the downwardly extending projection 59 prevents the floating bearing member 16 from moving any further to the left as shown in Fig. 6, to prevent the point of contact from being carried to the reverse side of the axis of rotation but freely permitting such floating bearing member to move to the right to carry out all of its function in the forward operation of the automobile or the like.

When it is desired to put the automobile or the like into reverse for backing up purposes, it will be apparent that projection 59 must be moved to the left as viewed in Fig. 6, to permit movement to the left of bearing member 16. To effect this sliding movement of the plate 57 and projections 58 and 59, the unlatching plate 65 is provided with a lateral portion 72 terminating in an upwardly extending handle member 73 operating in slot s in the top plate 29 of frame 15. By pushing said handle member 73 and lateral projections 72 to the left as viewed in Fig. 6, cam surface 67 will ride under the laterally extending projection 74 at the bottom end of latching pin 62, thus elevating said latch pin over said cam surface, and further continued movement to the left will carry plate 57 and projections 58 and 59 to the left until the bottom end of latch pin 62 drops into notch 60, at which time the projections 58 and 59 will occupy the position shown in dotted lines in Fig. 6. A limited amount of sliding of unlatching plate 65 with relation to plate 57 to permit this elevation of latching pin 62 to unlocked position is made possible by slots 68 and 69 moving to the left in Fig. 6 over pins 70, 71. These slots are of sufficient length to move cam face 67 far enough to the left to elevate latching pin 62 to the top horizontal surface of unlatching plate 65, after which the right-hand ends of slots 68 and 69 will strike pins 70 and 71 and cause plates 65 and 57 to travel together until notch 60 registers with the latching pin 62 and receives the same. During this movement of projections 58 and 59, projection 58 will contact with the adjacent side of bearing member 16 and force it to the left to the position shown in dotted lines in Fig. 6, which is the reverse position. This can only be accomplished when the driving disc 1 and driven wheel 2 are separated.

Figure 9:
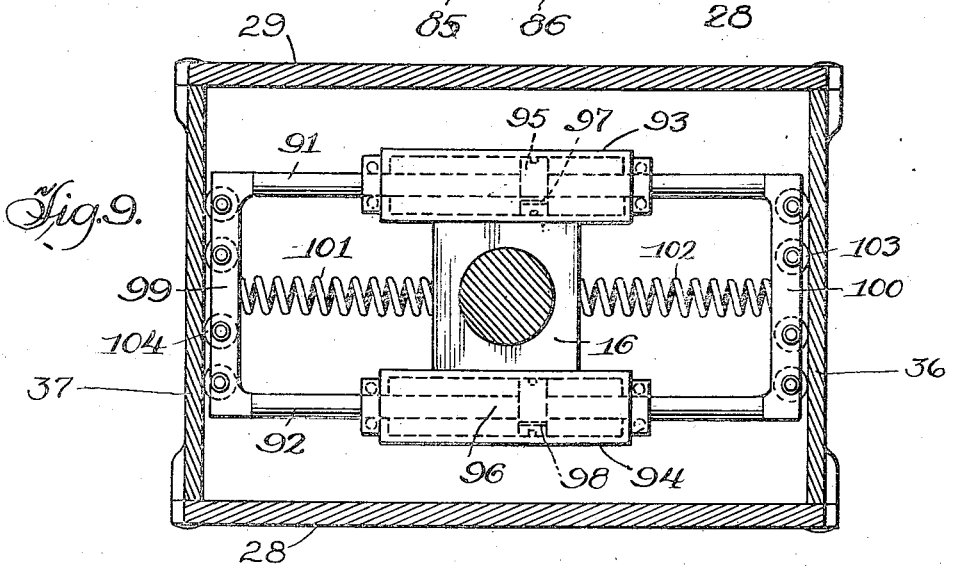
Fig. 9 is a vertical transverse section showing a modification of the mechanism shown in Fig. 4 for controlling the lateral sidewise movements of the floating bearing and driving disc.

In Figs. 8 and 9 are shown a different arrangement of mechanism for controlling the sidewise and up and down movements of the floating bearing member 16. Fig. 8 shows this modified mechanism for controlling the up and down movement, while Fig. 9 shows the modified mechanism for controlling the movements of the floating bearing member in horizontal directions. In Fig. 8 the bearing member 16 has rigidly attached to its two lateral sides cylinders 75 and 76, which at all times move with the bearing member. Extending through each of these cylinders is a piston rod 77 and 78, carrying on the interior of the cylinder piston heads 79 and 80, which piston heads are each provided with one or more apertures 81 and 82, through which pass oil or other suitable liquid for controlling the speed of movement of these piston heads within the cylinder in a manner similar to that described above in connection with the apertures 42 in cylinders 34 and 35. These piston heads 79 and 80 are fixed to piston rods 77 and 78 so as to be stationary vertically while the cylinders 75 and 76 move up or down with bearing member 16. Connecting the upper ends of piston rods 77 and 78 is a cross-bar 83, carrying at its upper edge a plurality of rollers 84 to contact with the underface of top plate 29 of frame 15 for anti-friction purposes. Connecting the bottom ends of piston rods 77 and 78 is a bar 85, which may be integral with said piston rods or attached thereto as desired, and carry the anti-friction rollers 86 for contact with the bottom plate 28 of the frame 15. Mounted between bearing member 16 and the top cross-bar 83 are springs 87 which perform a function similar to springs 51 in Fig. 5. In Fig. 8 the cylinders 75 and 76 with their associated piston heads, perform the same functions and act in a similar manner to cylinders 54 and 56 and associated parts of Fig. 5. Mounted between the bottom face of bearing member 16 and the bottom cross-bar 85 are springs 88, which act in a similar manner to the springs 52 in Fig. 5. The top plate 29 of frame 15 is provided with a slot 89, through which extends the projection 90 fixed to the upper end of piston rod 77. The mechanism shown in Fig. 8 operates in a similar manner to that shown in Fig. 5, and the differences thereover will be readily understood from an inspection of these figures.

A mechanism similar to that described above in connection with Fig. 8 is shown in Fig. 9 for controlling the horizontal lateral movements of bearing member 16, this mechanism in general comprising the piston rods 91, 92, cylinders 93, 94, pistons 95, 96, provided with apertures 97, 98, cross-bars 99 and 100, connecting the respective ends of the piston rods, and springs 101, 102, positioned between said cross-bars and the floating bearing member 16. Also in Fig. 9 are provided anti-friction rollers 103, 104, which function in a manner similar to rollers 84 and 86 in Fig. 8, except that they contact with the vertical side plates 49 and 50 as the bearing member 16 is moved up or down during the operation of the driving mechanism. The ends of the cylinders 75, 76, 93 and 94 will be provided with suitable means for non-leakable sliding engagement with their respective rods.

Figure 10:
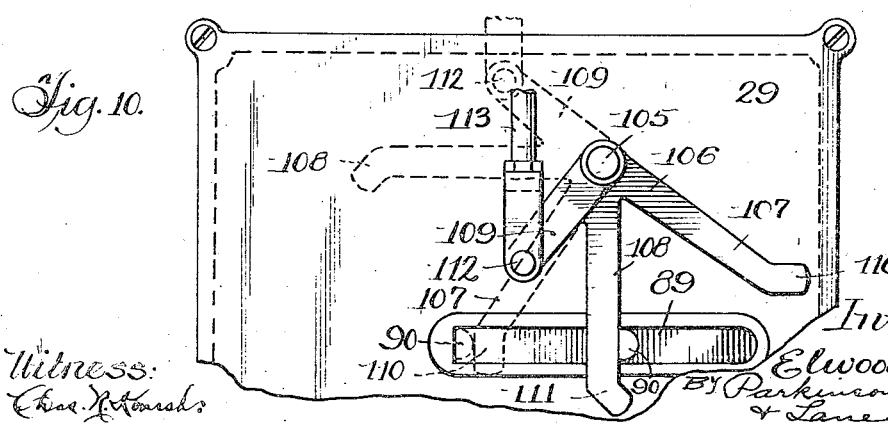
Fig. 10 is a fragmentary top plan view of mechanism for effecting reverse movement of the automobile or the like, and showing a modification over that illustrated in Figs. 6 and 7.

In Fig. 10 I have shown mechanism for positively holding the bearing member 16 and associated parts out of reverse except when reverse is desired, and at such time permitting such reverse to be effected. As shown in Fig. 10, the slot 89 referred to above is formed in the top plate 29 of the frame 15, and within this slot is slidably mounted the upstanding projection 90 of piston rod 77. Pivotally mounted in top plate 29 at 105 is the bell crank 106 provided with the three arms 107, 108 and 109. Each of arms 107 and 108 is formed at its free end with a bent portion 110 and 111, which assists in holding post or projection 90 in the desired position. Pivoted at 112 to arm 109 is a connecting rod 113 which extends forwardly to such position for operation by a lever or other suitable mechanism from the operator's seat, such lever or the like having suitable means such as a dog or the like for positively holding it in such position as it may be moved into. In the position shown by heavy lines in Fig. 10, arm 108 is holding post 90 from moving to the left while permitting projection 90 to move between arm 108 and the end of the slot to the right, this being the motion required for the bearing 16 in the operation of the car in forward direction. As before mentioned, arm 108 and the other parts of the bell crank 106 are held solidly in the position they now occupy until moved therefrom by control from the driver's seat. When it is desired to reverse the driving operation of the car, pressure is applied from the driver's seat to move connecting rod 113 to the position occupied by the dotted lines. This will bring arm 108 to the position shown in dotted lines. It will also bring arm 107 to the position shown in the dotted lines. By moving the bell crank 106 with its projecting arms to the positions indicated by the dotted lines in Fig. 10, arm 108 will be released from its position shown by the heavy lines and projection 90 will be free to be moved to the left. As the bell crank 106 is moved to the position shown by the dotted lines, arm 107 will engage projection 90 and move it to the position shown in the dotted lines, where it will be held securely by the bent portion 110. This moving of the projection 90 (which is a part of the carriage controlling the vertical movement of the bearing illustrated in Fig. 8), will move the bearing 16 to the left so that the point of contact between disc 1 and the wheel 2 is now on the side of the center axis, where the rotation imparted to wheel 2 will be the reverse of what was formerly applied in forward operation of the car. In other words, the car will now be driven in reverse for backing up. To effect a change back to forward operation connecting rod 113 is pushed toward the rear by the operator so that the bell crank 106 is moved back to the position shown by the heavy lines. In so doing arm 108 will engage with the projection 90 and will carry it again to the position shown by the heavy lines. The car will now be in forward position.

When desired in some makes of cars where the torque and load are stronger than usual, I provide for the use of a metal guide plate 114 shown in Fig. 11. This plate is provided around its edges with flanges 115, 116 and 117, by which it may be bolted across the interior of the frame 15 so that the laterally extending opening or guideway therein will straddle the bearing member 16. This plate is cut away to form the upper slanting guide 118 and the lower slanting guide 119, which increase in distance apart as they extend to the right in Fig. 11. These guides merge into the opening 120, which is of sufficient height and width to receive the bearing member 16 laterally but prevent any vertical movement thereof while it is in said opening 120. This opening 120 is so positioned that when the bearing member 16 is moved thereinto, the bearing member will be in reverse position with the point of contact in position for reverse operation of the driving mechanism. As stated, when the bearing member 16 is in this reverse position vertical movement thereof is not required. When, however, the bearing member 16 is moving in its normal operation during forward movement of the automobile or the like, a certain amount of vertical movement is necessary, and this is provided for by the spaced apart inclined edges 118 and 119, which define an opening of increasing width toward the right in Fig. 11.

It will be seen that when the point of contact is near the center axis, the amount of motion above or below the horizontal diameter must be limited, since great amount of vertical motion would put the point of contact in such position that there would be more sidewise thrust and less rotational drive upon the driven wheel 2. For this reason when the bearing 16 is in the position of great leverage or near the center axis of disc 1, it will be found between the guides 118 and 119 in such position where only a small amount of vertical motion is required or permitted. This confining of the vertical motion will relieve the strain upon the springs shown in the controlling devices. At the same time as the contact point is moved outward toward the circumference of disc 1, it will be seen that considerably greater distance above or below the horizontal diameter A—B will be necessary in order to obtain any thrust inward or outward. For this reason guiding edges 118 and 119 are so cut away as to permit much greater vertical motion as the bearing is moved toward the right and the point of contact moves nearer to the circumference of disc 1.

Having now described my invention, I claim:

1. In power transmitting mechanism, a driving shaft having at one end a universal joint connecting the driving shaft with the source of power and mounted at its other end in a floating bearing, a driving disc on the floating end of said driving shaft, a driven element driven by said driving disc, said floating bearing being capable of movement in all directions laterally of said shaft, and yieldable resistance means for controlling said lateral movements.

2. In power transmitting mechanism, a rotatable driving element, a driven element driven by frictional contact with the driving element, one of said elements being movable to move the point of contact between said two elements up or down or horizontally towards or away from the axis of rotation of the driving element, and means for normally causing said point of contact to always assume substantially the same position above and to one side of said axis of rotation when said two elements are separated.

3. In power transmitting mechanism, a rotatable driving element, a driven element driven by frictional contact with the driving element, one of said elements being movable to move the point of contact between said two elements up or down or horizontally towards or away from the axis of rotation of the driving element, means for normally causing said point of contact to always assume substantially the same position above and to one side of said axis of rotation when said two elements are separated, and means to positively prevent horizontal movement of said point of contact to the opposite side of said axis of rotation except when desired.

4. In power transmitting mechanism a driving shaft, a driving disc fixed to said shaft to rotate therewith, a bearing for said shaft adjacent said driving disc, the bearing and the end of said shaft to which said disc is fixed being movable in all directions laterally of said shaft, a driven element driven by frictional contact with said disc, the bearing being mounted in such manner that the variation in resistance from the driven element shall cause the driving disc to push itself upward or be pushed downward to such a position that the thrust at the point of contact shall move it nearer to or farther from the axis of rotation of the driving disc in accordance with the change in differential between the power and load to automatically shift the point of contact to apply greater or less power as required for load conditions.

5. In power transmitting mechanism a driving shaft, a driving disc fixed to said shaft to rotate therewith, a bearing for said shaft adjacent said driving disc, the bearing and the end of said shaft to which said disc is fixed being movable in all directions laterally of said shaft, a driven element driven by frictional contact with said disc, the bearing being mounted in such manner that the variation in resistance from the driven element shall cause the driving disc to push itself upward or be pushed downward to such a position that the thrust at the point of contact shall move it nearer to or farther from the axis of rotation of the driving disc in accordance with the change in differential between the power and load to automatically shift the point of contact to apply greater or less power as required for load conditions, and means for always bringing the locus of the point of contact back to approximately the same relative position upon separation of the driving disc and driven element.

6. In power transmitting mechanism a driving shaft, a driving disc fixed to said shaft to rotate therewith, a bearing for said shaft adjacent said driving disc, the bearing and the end of said shaft to which said disc is fixed being movable in all directions laterally of said shaft, a driven element driven by frictional contact with said disc, the bearing being mounted in such manner that the variation in resistance from the driven element shall cause the driving disc to push itself upward or be pushed downward to such a position that the thrust at the point of contact shall move it nearer to or farther from the axis of rotation of the driving disc in accordance with the change in differential between the power and load to automatically shift the point of contact to apply greater or less power as required for load conditions, means for always bringing the locus of the point of contact back to approximatly the same relative position upon separation of the driving disc and driven element, and means for steadying the lateral movement of said shaft and disc against sudden thrusts.

7. In power transmitting mechanism, a driving shaft having one end mounted in a bearing capable of movement in all directions radially of said shaft, a driving disc fixed to rotate with said shaft, and spring means to tend to resist but yet permit said movements radially of said shaft.

8. In power transmitting mechanism, a driving shaft having one end mounted in a bearing capable of movement in all directions radially of said shaft, a driving disc fixed to rotate with said shaft, spring means to tend to resist but yet permit said movements radially of said shaft, and fluid resistance means supplementing said spring means.

9. In power transmitting mechanism, a rotatable driving element, a driven element driven by frictional contact with the driving element, one of said elements being movable to move the point of contact between said two elements up or down or horizontally towards or away from the axis of rotation of the driving element, means for normally causing said point of contact to always assume substantially the same position above and to one side of said axis of rotation when said two elements are separated, means to positively prevent horizontal movement of said point of contact to the opposite side of said axis of rotation except when desired, and means for overcoming said prevention means and for moving said point of contact to said opposite side for reverse.

10. In power transmitting mechanism, a driving disc, means for rotating said disc, means for movably supporting said disc for movement in all directions edgewise of said disc, a driven element driven by frictional contact with said disc, said driven element being held against all movement except rotation, said means for movably supporting the driving disc being mounted in such manner that the variation in resistance from the driven element shall cause the driving disc to push itself upward or be pushed downward to such a position that the thrust at the point of contact shall move it nearer to or farther from the axis of rotation of the driving disc.

11. In power transmitting mechanism, a rotatable driving element, a driven element driven by frictional contact with said driving element, means for controlling movement of the point of contact between the driving element and the driven element above and below the horizontal diameter of the driving element and nearer to and farther away from the axis of rotation of the driving element whereby the driving thrust at said point of contact will cause movement of said point of contact to move to such positions with relation to said axis of rotation as to automatically vary the driving mechanical advantage to suit the varying requirements between power and load for maximum efficiency and to eliminate manual gear shifting, and means for always returning said point of contact to the same position when said driving and driven elements are separated.

12. In power transmitting mechanism a rotatable driving element, a driven element driven by frictional contact with said driving element, one of said elements being mounted for lateral movement with relation to the other generally in all directions, spring means arranged for yieldably resisting said lateral movement in one direction, and spring means arranged substantially at right angles to said first mentioned spring means for yieldably resisting said lateral movement in another direction.

13. In power transmitting mechanism a rotatable driving element, a driven element driven by frictional contact with said driving element, one of said elements having lateral movement with relation to the other generally in all directions, spring means arranged for yieldably resisting said lateral movement in one direction, and spring means arranged substantially at right angles to said first mentioned spring means for yieldably resisting said lateral movement in another direction, said first and second mentioned spring means being so arranged as to always return the point of contact between the driving element and the driven element to the same position when the driving and driven elements are separated.

ELWOOD E. SMITH.